(12) United States Patent
Van Hoesen

(10) Patent No.: US 7,698,903 B1
(45) Date of Patent: Apr. 20, 2010

(54) ENERGY EFFICIENT VENTILATION SYSTEM

(75) Inventor: George E. Van Hoesen, Nixa, MO (US)

(73) Assignee: Global Green Building, LLC, Ozark, MO (US)

( * ) Notice: Subject to any disclaimer, the term of this patent is extended or adjusted under 35 U.S.C. 154(b) by 473 days.

(21) Appl. No.: 11/410,823

(22) Filed: Apr. 24, 2006

(51) Int. Cl.
*F25B 49/00* (2006.01)
*F25B 19/00* (2006.01)
*F24J 3/08* (2006.01)
*F25D 23/12* (2006.01)

(52) U.S. Cl. .............................. 62/176.6; 62/79; 62/260; 62/270; 165/45

(58) Field of Classification Search ............. 62/79, 62/176.6, 270, 260; 165/270, 45
See application file for complete search history.

(56) References Cited

U.S. PATENT DOCUMENTS

| | | | |
|---|---|---|---|
| 2,355,495 A | 8/1944 | Zier, Jr. | |
| RE26,430 E * | 8/1968 | Beeler | 165/211 |
| 4,042,012 A | 8/1977 | Perry et al. | |
| 4,071,080 A | 1/1978 | Bridgers | |
| 4,142,576 A | 3/1979 | Perry et al. | |
| 4,205,718 A | 6/1980 | Balch | |
| 4,237,963 A | 12/1980 | Girard | |
| 4,323,113 A * | 4/1982 | Troyer | 165/45 |
| 4,344,414 A | 8/1982 | Balch | |
| 4,367,631 A * | 1/1983 | Johnson et al. | 62/79 |
| 4,369,635 A | 1/1983 | Lambert | |
| 4,384,609 A | 5/1983 | Nuezil | |
| 4,449,572 A | 5/1984 | Lambert | |
| 4,567,939 A * | 2/1986 | Dumbeck | 165/224 |
| 4,842,048 A | 6/1989 | Higaki | |
| 4,894,535 A * | 1/1990 | Madnick et al. | 250/255 |
| 5,038,580 A | 8/1991 | Hart | |
| 5,081,848 A | 1/1992 | Rawlings et al. | |
| 5,209,286 A | 5/1993 | Schmidt | |
| 5,477,703 A | 12/1995 | Hanchar et al. | |
| 5,590,830 A * | 1/1997 | Kettler et al. | 236/49.3 |
| 5,730,208 A | 3/1998 | Barban | |
| 6,293,120 B1 | 9/2001 | Hashimoto | |
| 6,347,527 B1 | 2/2002 | Bailey et al. | |

* cited by examiner

*Primary Examiner*—Ljiljana (Lil) V Ciric
(74) *Attorney, Agent, or Firm*—Brian B. Diekhoff; Polsinelli Shughart PC

(57) ABSTRACT

The energy efficient ventilation system provides tempered air to an air to air heat exchanger, such as a heat pump. The system includes independent air intake sources from a tunnel, a structure, and the exterior of the structure that direct air to a control module. Regulators control the amount of air that enters the control module from the air intake sources. The control module mixes the intake air and distributes the tempered air to the structure and to the air to air heat exchanger.

19 Claims, 8 Drawing Sheets

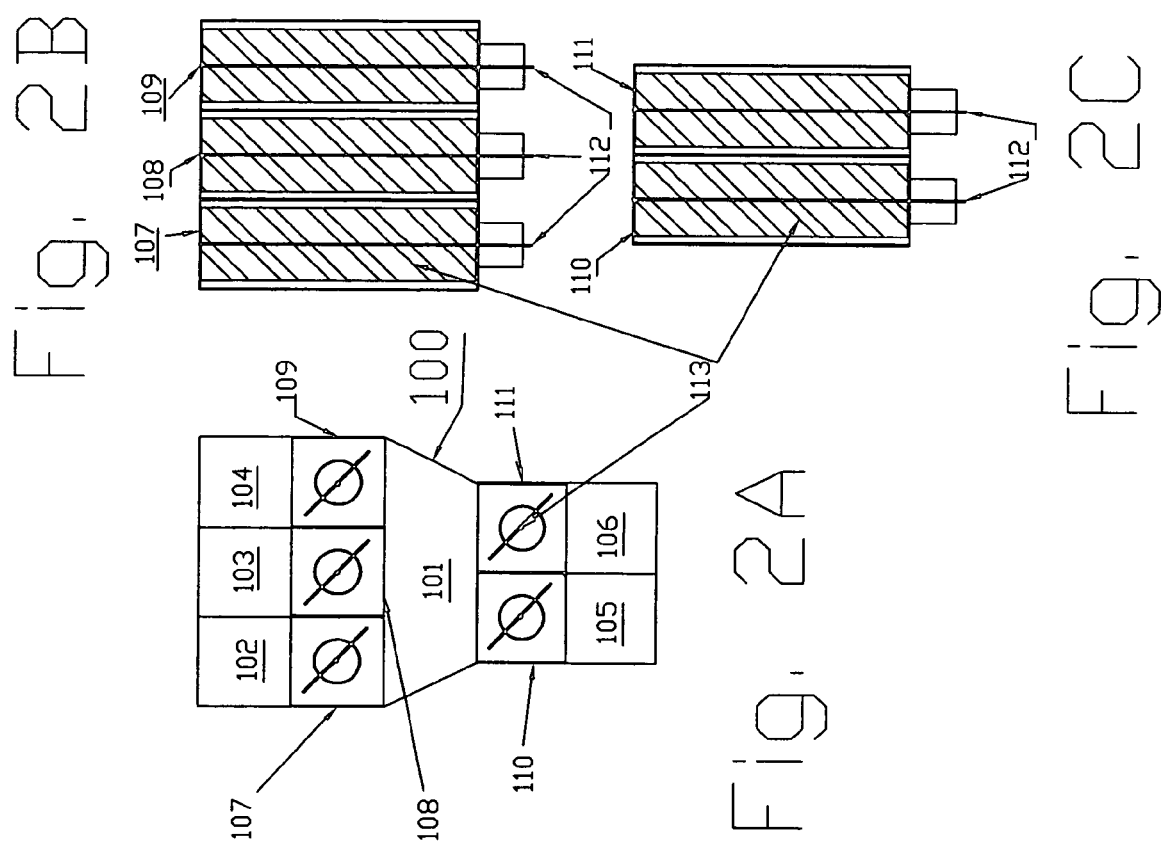

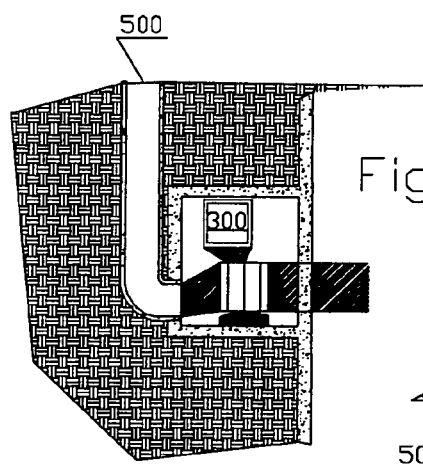
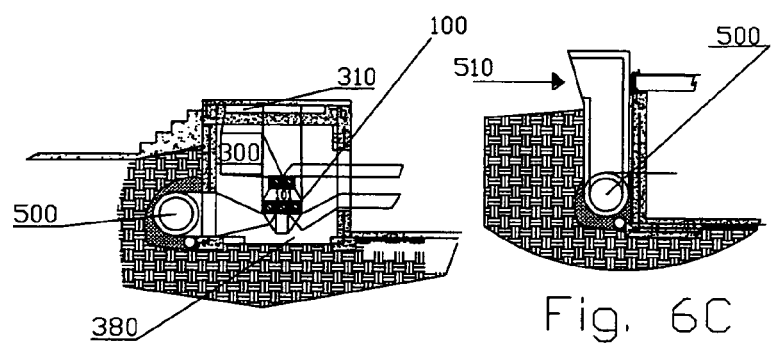
Fig. 6B
Fig. 6A
Fig. 6C

FIGURE 8

| | Summer Day | Summer Night | Fall Day | Fall Night | Spring Day | Spring Night | Winter Day | Winter Night |
|---|---|---|---|---|---|---|---|---|
| Temperature Outside | 90 | 70 | 72 | 58 | 72 | 58 | 45 | 20 |
| Humidity Outside | 85 | 85 | 40 | 40 | 75 | 75 | 30 | 30 |
| Desired Temperature | 72 | 72 | 72 | 72 | 72 | 72 | 68 | 68 |
| Desired Ventilation | 15% | 25% | 25% | 25% | 25% | 25% | 20% | 15% |
| Temperature Tunnel Air | 76 | 72 | 68 | 64 | 64 | 60 | 46 | 42 |
| Temperature Return Air | 72 | 72 | 72 | 72 | 68 | 68 | 68 | 68 |
| Temp of Supply Air to Structure | 75 | 72 | 69 | 66 | 65 | 62 | 58 | 56 |
| Temp of Supply Air to H/P | 78 | 70 | H 72 C 68 | H 64 C 58 | H 72 C 64 | H 60 C 58 | 46 | 42 |
| Damper Tunnel Duct % Open | 100% | 0% | H 0% C 100% | H 100% C 0% | H 0% C 100% | H 0% C 100% | 100% | 100% |
| Damper Outside Duct % Open | 0% | 100% | H 100% C 0% | H 0% C 100% | H 100% C 0% | H 100% C 0% | 100% | 0% |
| Damper Return Duct % Open | 15 | 25 | 25 | 25 | 25 | 25 | 20 | 15 |
| Damper Supply Air to HP % Open | *100 | *100 | *100 | *100 | *100 | *100 | *100 | *100 |
| Damper Supply Air to Structure % Open | 15 | 25 | 25 | 25 | 25 | 25 | 20 | 15 |

H = Heating used
C = Cooling used
* = Only open while outside unit is operating

ENERGY EFFICIENT VENTILATION SYSTEM

FIELD OF THE INVENTION

The present invention relates to an energy efficient ventilation system that provides tempered air to a heat pump and to the interior of a structure.

BACKGROUND OF THE INVENTION

Heat pumps work by moving heat or cold from a supply side to a demand side of the heat pump. The use and operation of heat pumps are described in U.S. Pat. Nos. 6,318,095, 5,782,101, 4,394,816, and 4,240,269 (collectively incorporated by reference herein). Heat pumps move the heat and cold by a compressor and a coil configuration using a refrigerant that is compressed and then moved through a cooling coil where air is blown through the coil to remove heat from the coil. In the wintertime, the coil emits heat from the atmosphere into the interior. In the summer, heat absorbed by the coil from the interior of the structure is exhausted through the outside unit of the heat pump. This type of configuration and its ability to change to which side the heat is exhausted makes a heat pump a popular appliance for efficient heating and cooling in any moderate climate.

The efficiency achieved by a heat pump is limited by the outside air temperature. As the outside air temperatures reach the limits of the heat pump, the amount of energy that is consumed increases and there is a point where the heat pump unit can no longer satisfy the demand. This point is near approximately a 25 degree F. outside differential, i.e., when there is more than a 25 degree F. difference between the inside and outside temperatures, the heat pump unit must operate all of the time. Outside this temperature differential in the winter, auxiliary heat is used, for example, by an electric furnace, and energy consumption is increased. In the summer time, the heat pump cannot keep up with demand and there is usually no auxiliary type of cooling for the structure. Thus, it is often not possible to only use a heat pump for heating and cooling needs beyond the moderate climatic regions. This generally limits the use of a heat pump to only the moderate range of climates in the world.

Many efforts to expand the usable range of heat pumps have resulted in innovations such as ground source heat pumps that use a much more stable heat sink, the ground, and still save energy. The expense of putting the coil under ground has been a disadvantage to the widespread use of these systems. Since the ground varies by only 20 degrees F. at the depths typically used in a ground source heat pump, savings in energy are achieved. However, the savings has not offset the cost of the system and higher maintenance costs. These systems tend to have many more problems than a typical heat pump and have only limited appeal. These systems also do not take advantage of the better temperature differences at different times of the day through other air supply sources, and thus they are not as efficient as possible.

SUMMARY OF INVENTION

The present invention includes a system for providing tempered air to an air to air heat exchanger, such as a heat pump. The system includes independent air intake sources from a tunnel, the interior of a structure, and the exterior of the structure that each direct air to a control module. Regulators control the amount of air that enters the control module from the air intake sources. The control module mixes the intake air to temper the intake air. The control module distributes the tempered air to the structure and to exterior portion of the air to air heat exchanger. The system improves the efficiency of the air to air heat exchanger, as well as the general ventilation of the structure to improve air quality.

The system may be used with nearly any air to air heat exchanger, since the system does not require any special modification or adaptation to be used with a particular air to air heat exchanger. Further, the particular air to air heat exchanger unit is not modified or adapted to be used with the system. Instead, only the ducting or venting of the air to air heat exchanger unit is modified or adapted to include the system. The system tempers the air leading to the air to air heat exchanger, and thus has universal application with nearly all air to air heat exchangers and heat pumps.

The system includes the tunnel beneath ground level, the tunnel having an entrance that draws air from the atmosphere. A tunnel air intake duct directs tunnel air from the tunnel to the control module. An outside air intake duct directs outside air from the atmosphere to the control module. A return air intake duct directs return air from the structure to the control module. The control module regulate and directs the air received from the intake ducts to an air supply that is in communication with the exterior portion of the air to air heat exchanger and to another air supply in communication with the interior portion of the air to air heat exchanger.

The present invention further includes the control module. The control module may be used with any air to an air to air heat exchanger. The control module includes a tunnel air intake duct that directs tunnel air from the tunnel to the control module. The control module includes the outside air intake duct that directs outside air from the atmosphere to the control module. The control module includes a return air intake duct that directs return air from the structure to the control module. The control module includes a mixing chamber to mix the air received from the intake ducts. The control module regulate and directs the air received from the intake ducts to an air supply that is in communication with the exterior portion of the air to air heat exchanger and to another air supply in communication with the interior portion of the air to air heat exchanger.

BRIEF DESCRIPTION OF DRAWINGS

FIGS. 2(a)-2(c) are detailed views of the control module and the series of dampers which are controlled by a PLC (programmable logic control) unit. The control module of FIG. 2 has rectangular ducts.

FIGS. 6(a)-6(c) shows views of the heat pump storage area and the tunnel.

FIG. 8 shows inputted conditions, current conditions and the system operation at exemplary days.

DETAILED DESCRIPTION OF PREFERRED EMBODIMENTS

Figure 1:
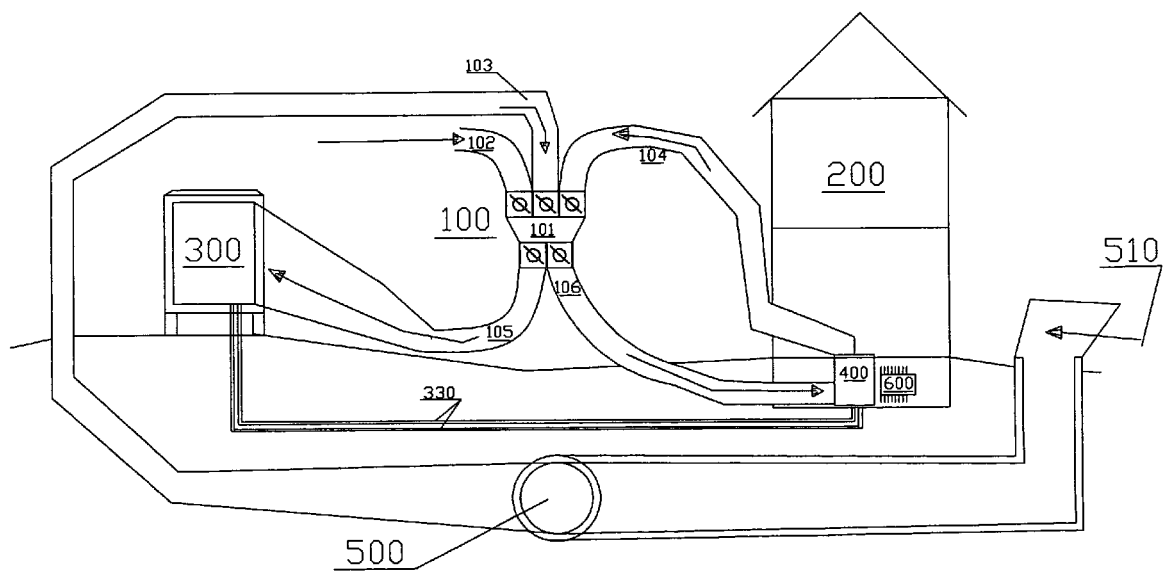
FIG. 1 is a view of the control module and the general flow pattern to show the air flow directions of the outside air, the structure return air, the tunnel air, and the supply airs.
Figure 3A:
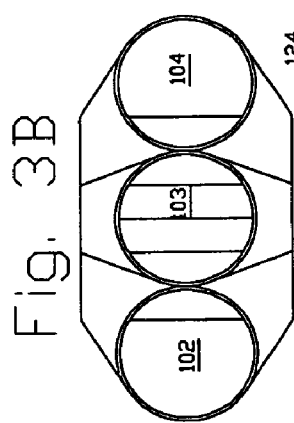
FIGS. 3(a)-3(e) are detailed views of the control module using round ducts leading to rectangular dampers.
Figure 3B:
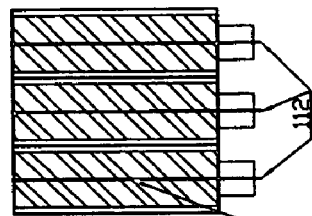
Figure 3C:
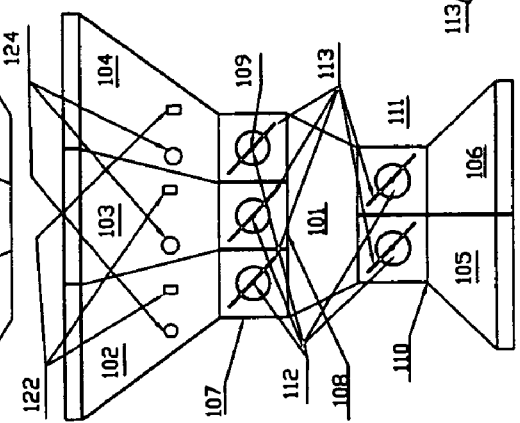
Figure 3D:
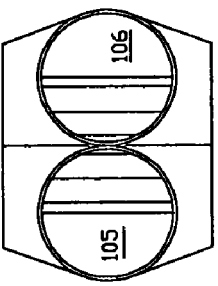
Figure 3E:
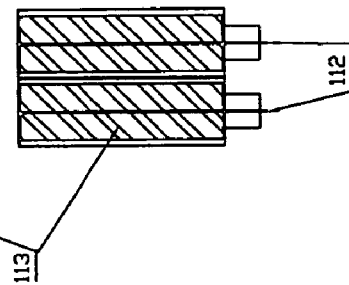

The present invention provides an efficient and effective system for ventilating a structure and both of the inside and outside coils of a heat pump or other similar structures of an air to air heat exchanger. The present invention allows the user to ventilate the structure in a highly efficient manner while heating and cooling the structure. The present invention provides the outside coils of the heat pump with tempered air and improves the efficiency of the heat pump. The present invention further tempers incoming outside air when ventilation is desired, thus providing more efficient ventilation of the structure.

The present invention includes a system for providing tempered air to an exterior portion of an air to air heat exchanger, such as a heat pump. The energy efficient ventilation system provides tempered air to an air to air heat exchanger, such as a heat pump. The system includes independent air intake sources from a tunnel, the interior of the structure, and the exterior of the structure that each direct air to a control module. Regulators control the amount of air that enters the control module from the air intake sources. The control module mixes the intake air to temper the intake air. The control module distributes the tempered air to the structure and to the air to air heat exchanger. The system improves the efficiency of the air to air heat exchanger.

The system includes at least three independent air intake air sources and distributes them to at least two independent air supplies using the control module. One air supply is in communication the control module and the heat pump, while another air supply is in communication with the control module and the interior of the structure. The system further includes a tunnel of sufficient size to handle the volume of air that is demanded by the heat pump. The system includes controls to regulate the system.

This system has application in all regions of the United States as well as Canada, Mexico, and all over the world. Typically, it is preferred that the indoor temperature of the structure should only vary by two to four degrees F., depending on the control system used. However, during any 24 hour period of the day, the ambient temperatures outside of the structure may vary by as much as 20 to 40 degrees F. Importantly, the ground temperature will only vary by less than one degree during nearly all 24 hour periods. For example, an average summer ambient high temperature is 85 degrees F. in a moderate or temperate region, while an average summer ambient low temperature is 65 degrees F. Meanwhile, the average summer ground temperature at five feet deep is 64 degrees or less, with little variance throughout the day. Further, an average winter ambient high temperature is 40 degrees F., while an average winter ambient low temperature is 20 degrees F. Meanwhile, the average winter ground temperature at five feet is approximately 50 degrees F. or warmer, with little variance throughout the day. Thus, tunnel air, which may be warmed by the ground in the winter and cooled by the ground in the summer, will provide an advantage to the heat pump in the winter and the summer.

By using a system of ducts and dampers, the present invention supplies the "best" air to the heat pump as needed and to ventilate the structure. In new construction for residential structures, this can be accomplished with a tunnel or pipe placed around the foundation of the new construction. The control module may be placed inside or outside, above grade or below grade, and/or integrated with the outside or inside units of the heat pump. This new system does not require the addition of any heat exchangers to the existing HVAC system other than a tunnel and only uses the most efficient air, thereby not needing to add or change existing heat pump systems other than ducting them in a different manner. Although there could be an integration of the systems, this is not required to utilize the present invention.

The present invention overcomes many of the problems associated with the use of heat pumps. Instead of relying on one source for their supply air, the present invention provides supply air that has been tempered by tunnel air, return air from the structure, outside air, or by a combination of any of the airs. Moreover, the system may just any amounts of any of the airs. By providing the "best" air supply to the heat pump and the ventilation of the structure, the range and efficiency of an air-to-air heat pump system is increased.

Conventionally, the efficient use of heat pumps has been limited to certain geographies that do not endure continued and extreme cold temperature. The present invention will expand the use of heat pumps to most of the United States and other regions with similar climates around the world. By using tunnel air, the outside air, and the return air of a structure, the systems of the present invention mix the correct amount of each of these air intake sources to deliver the most efficient mix of air to the structure and the heat pump. By using this system in conjunction with an air-to-air heat pump in either a surface or subsurface application, the range in which a heat pump may be used efficiently is substantially broadened.

The control module regulates the air received from the three independent intake air sources, mixes the air in its mixing chamber, and distributes the mixed air to the air supplies as a function of demand and the most efficient use of the various air sources. The control module includes temperature and humidity sensors to measure the temperature and humidity of the various air sources and air supplies. The control module further includes motorized and/or manual dampers to direct and regulate the intake air sources and the air supplies. The control module includes a mixing chamber that mixes the three incoming air sources. The control module directs the mixed air to the air supplies.

A first intake air source of uses the tunnel or a series of tunnels that are positioned underground. A tunnel air intake duct directs air from the tunnel to the control module. The tunnel uses the constant temperature of the ground to warm the air during cooler seasons and to cool the air during the warmer seasons.

A second intake air source uses the outside air. This is outside air that has not been typically tempered by any mechanical means. In the summer, the outside air may be warmer and have a higher humidity than the tempered air within the structure. In the winter, the outside air may be cooler and have a lower humidity than the tempered air within the structure. An outside air intake duct directs air from the outside to the control module.

A third intake air source uses return air from the structure. A return air intake duct directs return air from the structure to the control module. This return air is generally closer to the preferred temperature and humidity than the outside air and the tunnel air.

When air is pulled through a tunnel buried underground, temperature measurements indicate a temperature range that varies between the daily average ambient temperature and the ground temperature at the particular depth of the tunnel. This means that there will be times during most days when the tunnel air, the outside air, and the return air are at temperatures that will be more advantageous than any single source of air and a combination of them may be the most efficient of all. Importantly, by combining the air streams in the most efficient manner, one can significantly reduce and/or increase the ambient air temperature supplied to a heat pump for operation and thereby allowing the system to use either a smaller heat pump or to use much less energy than before. This also allows the heat pump systems to be effectively used in the more extreme regions of the world.

The present invention further provides for energy efficient ventilation of a structure in which ventilation is desired or required by the building code. Conventional ventilation techniques may just use untempered outside air. Although the outside air may be fresh, its temperature or humidity may significantly add to the heating or cooling load.

The present invention includes a system for providing tempered air to the exterior portion of an air to air heat exchanger, such as a heat pump. Although heat pumps may be used with the system of the present invention, other air to air heat exchangers, such as an M1010 extra high-efficiency gas/electric pack heating and cooling system from Maytag®, may be used with the present invention. Nearly any air to air heat exchanger or conventional heating and cooling system that would benefit from receiving the tempered air by the processes described herein may be used.

The tunnel depth and length will vary depending upon the likely demand on the system. The tunnel may extend for as little as approximately twenty feet. The tunnel may extend to longer distances such as approximately one hundred to approximately one hundred and fifty feet or as long as economical to do so. A tunnel having a length of approximately forty feet to approximately eighty feet suffices for most applications in the United States for a structure of approximately 1500 to 3000 square feet.

The tunnel should be placed at a depth of a minimum of three feet of overburden. A depth of approximately seven feet can achieve a very constant temperature. Of course, the tunnel may be placed at greater depths, however minimal addition returns in temperature efficiency will be gained if tunnel is deeper than seven feet as the temperature of the ground remains generally constant beyond seven feet and reaches its temperature mean very slow as it approaches 50 feet deep. In general, the depth and length should be as large as possible where practical.

The tunnel may be constructed of pvc, metal, concrete or other rigid materials. The tunnel may be formed from readily available pipes customarily used for sewer and drainage applications. The tunnel should have a thickness (depending upon the material used) to provide sufficient rigidity to withstand being covered with overburden or dirt. Depending upon the size and shape of the building lot, a series of tunnels may be necessary. The tunnels diameter may vary from approximately 1 foot to approximately 5 feet or larger. Preferably, the tunnel has a diameter of approximately 2 feet and a length of approximately 70 feet. When used with large structures, the single tunnel is replaced with several tunnels in different locations around the foundation or subbasements of the structure. A plurality of tunnels with smaller diameters may be bundled to provide the tunnel air. The numbers of tunnels, their depth, and their length will increase with larger structures and with greater demand.

Standard ducting may used for the present invention. The standard ducting is insulated on the outside of the duct, but preferably it is not insulated on the inside. The ducting may be made from aluminum, metals or other alloys as well as plastics of all types. Common sheet metal ducting generally used in residential and commercial buildings may be used. The various ducts move air from the tunnel, the outside, and the structure where it is mixed in the proper amounts in the control module and then redistributed to the heat pump outside unit and the return air of the inside unit of the heat pump. The ducting may be rectangular, circular, or ovular in shape. The ducting may have a cross sectional area of approximately 1 square foot to approximately 20 square feet or more depending on the demand of the heat pump and structure ventilation rates.

Common commercially available dampers are used in the ducts to control and regulate airflow to and through the control module. Dampers are used in each of the ducts leading to the mixing chamber. Additional dampers are uses in the ducts leading to the outside portion of the heat pump and the other to the inside portion of the heat pump.

The present invention may be used with commercially available heat pumps, for example, a 38YDB Infinity 17 unit from the Carrier® Corporation or a HPX15 heat pump unit from the Lennox® Corporation.

The present invention may also be used as a radon abatement system when ducted correctly in the structure. The system combines outside air and the inside air from the basement of the structure. This flow of air will help to reduce the radon levels of the structure and bring those levels near the outside, non-harmful and natural levels of radon. Radon is a naturally occurring gas, which is radioactive and is present all over the world. When radon levels are detected in the house, often a venting structure is required to be installed from the basement of the house and through the foundation to the exterior. Many radon abatement systems simply draw in fresh air to reduce the concentration levels of radon.

The present invention will now be described with respect to the embodiments described in the figures. FIG. 1 shows a general flow of the air intake sources and the air supplies through the heat pump unit and the structure. A control module 100 regulates and directs the airflows throughout the system. Three air intake ducts direct air to the control module 100. Namely, a tunnel air intake duct 103 directs air from a tunnel 300 to the control module 100. An outside air intake duct 102 directs outside air to the control module 100. The outside air intake duct 102 should be screened and filtered to reduce the possibility of contaminants and debris entering the system. A return air intake duct 104 directs air from a structure 200 to the control module 100.

The control module 100 includes a series of motor-controlled dampers that regulate the flow of air through the control module 100. The control module 100 includes temperature sensors 122 and humidity sensors 124 in each of the outside air intake duct 102, the tunnel air intake duct 103, and the return air intake duct 104. The sensors 122 and 124 and the motor-controlled dampers are in electrical communication with a programmable logic controller 600. The programmable logic controller 600 will calculate and direct the opening and closing of the dampers to provide the most efficient use of the three intake air sources depending upon the temperature and humidity conditions of each of the air streams in view of desired structure temperature inputted into the programmable logic controller 600 by the operator. The programmable logic controller may be for example, a Vesamax PLC from the General Electric Corporation or an SG2-20HT-D programmable relay from the TECO company. These models has sufficient memory and capacity to operate the present invention.

Turning now to FIGS. 2 and 3, the control module 100 is shown in detail. The outside air intake duct 102 contains an outside air intake damper 107. The tunnel air intake duct 103 includes a tunnel air intake damper 108. The return air intake duct 104 includes a return air intake damper 109. Each of the dampers 107, 108, 109 may be a Ruskin model CD355 with a Ruskin actuator model RJ 24-MOD commercially available from the Ruskin Corporation. Each damper 107, 108, and 109 includes a damper control blade 113 that is actuated by a damper control motor 112. As the damper control motor 112 rotates the damper control blade 113, the dampers 107, 108, and 109 control the amount of air into the control module 100.

The control module 100 may be made from aluminum, metals or other alloys as well as plastics of all type. The control module 100 includes entry openings for the various air intake ducts. The control module 100 will have three or more entry openings. The control module includes exit openings for the various air supplies. The control module 100 will have at least two exit openings or will vent to both the exterior portion of the heat pump unit and the interior of the structure.

Depending on the temperature and the humidity of the outside air, the tunnel air and the structure air and in view of the desired temperature programmed by the user, the programmable logic controller 600 actuates the dampers to provide a certain mix of air to enter a mixing chamber 101 of the control module 100. The programmable logic controller 600 may be programmed to check the temperature and humidity of the airs and adjust the dampers if needed at regular timed intervals.

In the mixing chamber 101, the various air streams are mixed with each other. The mixing chamber 101 is a cavity or volume defined by the walls and structure of the control module 100. The mixing chamber 101 should have a shape, such as a rectangular or ovular shape, that allows the intake airs to mix before exiting the mixing chamber 101.

The mixing chamber 101 has three entry openings—for the outside air intake duct 102, the tunnel air intake duct 103, and the return air intake duct, 104. Each of the outside air intake duct 102, the tunnel air intake duct 103, and the return air intake duct may taper in diameter or cross section as they approach the mixing chamber 101. The mixing chamber 101 has two exit openings—for an outside heat pump supply duct 105 and a structure return air supply duct 106. Both the outside heat pump supply duct 105 and the structure return air supply duct may increase in diameter or cross-section as they exit from the mixing chamber 101.

The mixing chamber may have a volume of approximately 3 cubic feet to approximately 9 cubic feet or larger as demand increases. This volume is suitable for satisfying the demands of a typical 1500 square foot to 3000 square foot residential structures. One of ordinary skill in the art will readily be able to adjust this volume to accommodate the demands of larger residential structures and much larger commercial structures.

After the desired proportions of the intake airs are mixed, the tempered air leaves the mixing chamber 101. The flow of the intake airs displaces the air mixed in the mixing chamber 101. The outside heat pump supply duct 106 also includes an outside heat pump supply damper 110. The structure return air supply duct 106 includes a structure return air supply damper 111. Both of the supply dampers 110, 111 are under the direction and control of the programmable logic controller 600.

The programmable logic controller 600 is generally contained within the structure where it may easily be operated by the user. In other embodiments, the programmable logic controller 600 may be integrated with the heat pump unit. The programmable logic controller 600 will have means to input a desired temperature and a desired ventilation rate. The programmable logic controller may include a thermostat that overrides the thermostat for the heat pump 300 or may be integrated with the thermostat.

The outside heat pump supply duct 105 is in open communication with the exterior heat pump unit 300. The structure return air supply duct 106 supplies air to an interior heat pump unit 400 and ultimately to the interior of the structure 200 through the conventional venting and ducting of the interior heat pump unit 400. The structure return air supply duct may pass through a wall of the structure 200. Pipes/coils 330 interconnect the exterior heat pump unit 300 and the interior heat pump unit 400.

Figure 4:
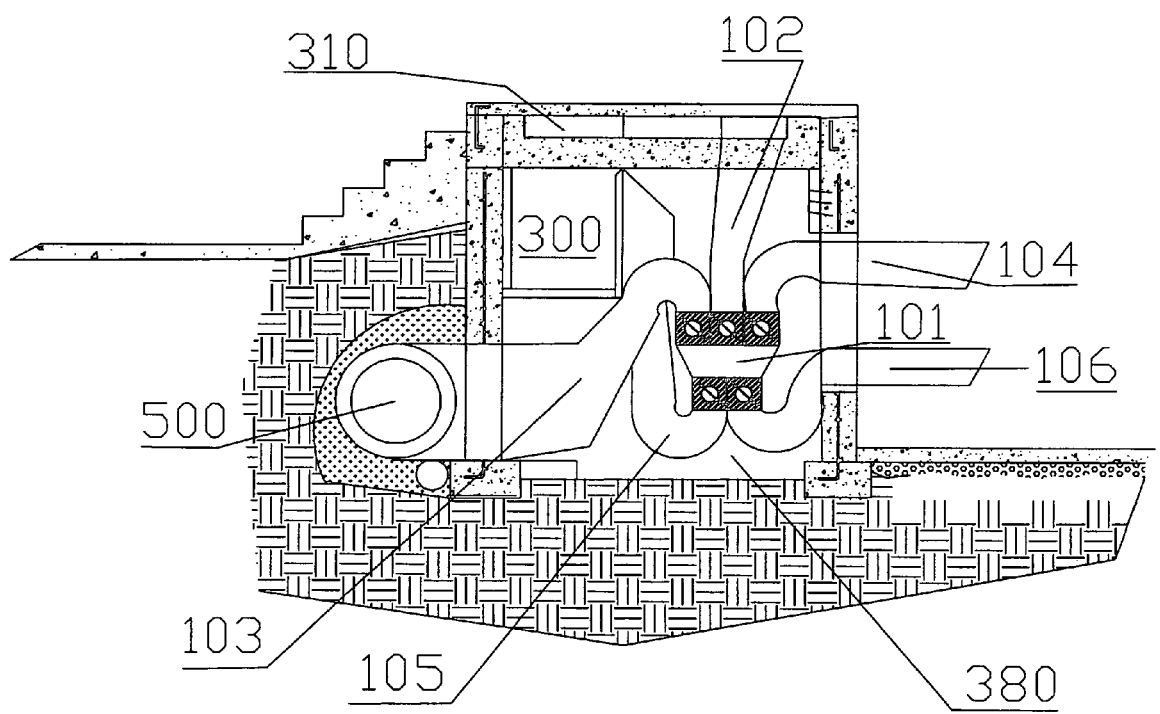
FIG. 4 shows a below grade installation with the control module, the heat pump, and the tunnel access under a porch section of the structure.
Figure 5:
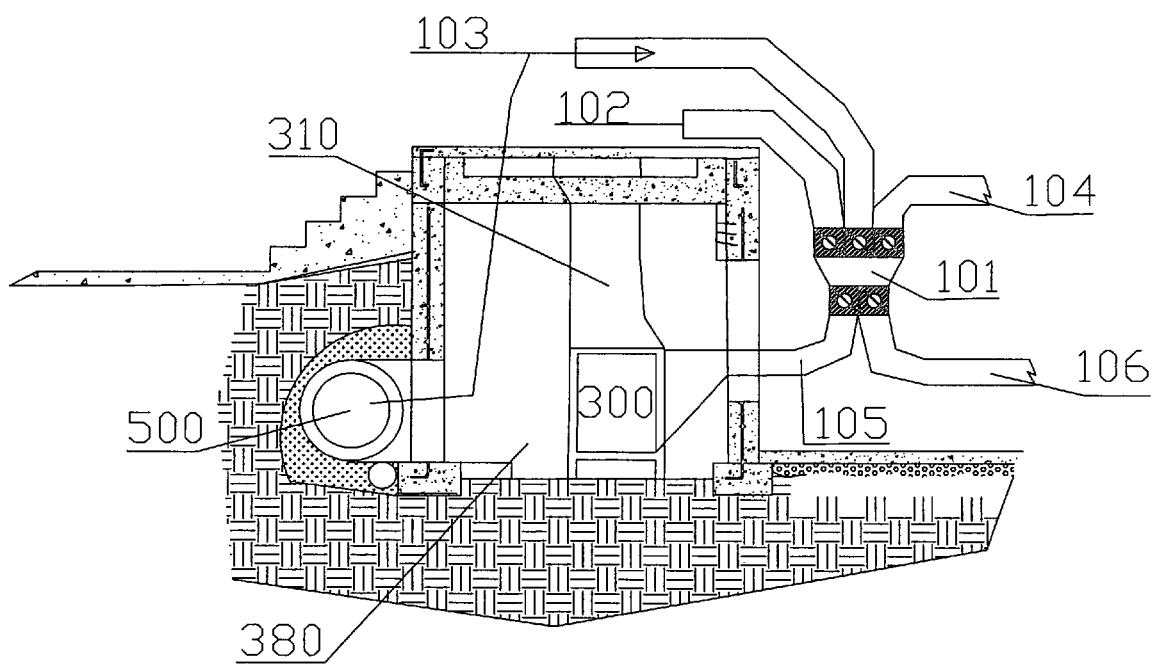
FIG. 5 shows a view of below grade installation where the control module is inside the structure and the heat pump is outside of the structure under a porch section below grade. Any of the equipment can be inside or outside, or above grade or below grade.
Figure 7:
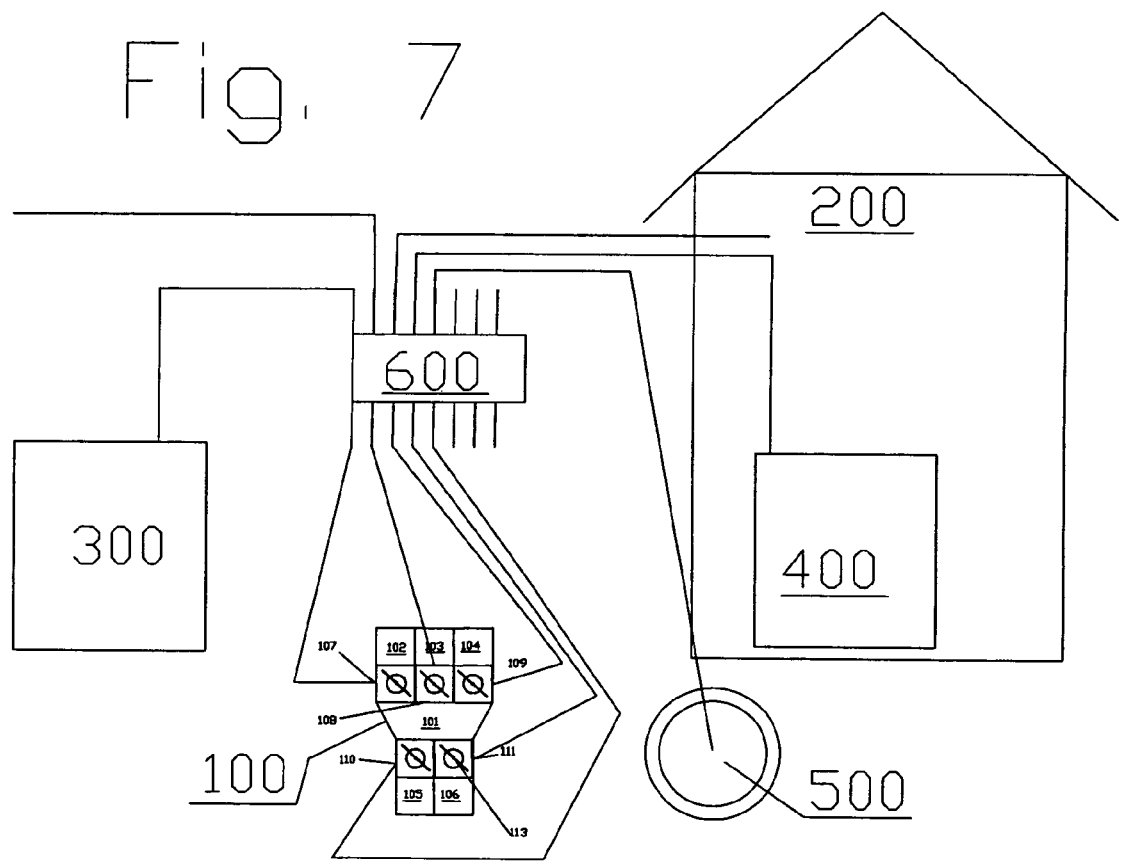
FIG. 7 shows a view of the PLC and its connection to the various components.

As shown in FIGS. 4 and 5, the exterior heat pump unit 300 is located on the exterior of the structure 200. The exterior heat pump unit 300 may be above or below grade. The control module 100 may be contained within the interior of the structure 200 as shown in FIG. 5, or the control module 100 may be situated adjacent to the heat pump 300 on the exterior of the structure 200 or submerged underground in a heat pump storage area 380 which should be covered and vented.

FIGS. 4 and 5 show the tunnel 500 and the tunnel air intake duct 103. The tunnel includes a tunnel opening 310 that opens to fresh air or the tunnel opening 310 may include a screened and filter duct that draws fresh air into the tunnel 500. The exterior heat pump unit 300 includes an exhaust 310 that vents to the atmosphere.

FIG. 8 shows a table of: (1) the inputted desired temperatures and ventilation rates as programmed by the user, (2) the current temperature and humidity measurements from the various sensors, (3) and the percent "open" each damper is based on the calculations by the programmable logic controller for these conditions. As the temperature and humidity measurements fluctuate from changes in weather, mechanical influences from the structure, etc., the programmable logic controller 600 will adjust % open of the dampers to provide the most efficient air supply to the exterior heat pump unit 300. The table is intended to represent actual conditions on various days of the year and the systems response to these conditions and may vary by the amount of control and desired ventilation rates for the structure.

One of ordinary skill in the art will recognize that the system and/or the control module of the present invention may be used with other devices or incorporate other devices to improve the efficiency of the heating and cooling system. For example, humidifiers and dehumidifiers may be incorporated into the system. The control module may be used with humidifiers and dehumidifiers. Filtration and air cleaning systems may be incorporated into the system.

The system and/or the control module may be used with or incorporate most conventional air to air heat exchangers. For example, the system and/or control module may be used with a heat recovery ventilator (HRV) to further improve efficiency. HRVs reclaim energy from exhaust airflows by using heat exchangers to heat or cool incoming fresh air. The system and/or control module may used with an energy recovery ventilators (ERVs), which exchange moisture between incoming and exhaust air streams.

While preferred embodiments of the present invention have been described, so as to enable one of skill in the art to practice the present invention, the preceding description is intended to be exemplary only. It should not be used to limit the scope of the invention, which should be determined by reference to the following claims.

What is claimed is:

1. A system for providing tempered air to an air to air heat exchanger, comprising:
   a tunnel beneath ground level, the tunnel having an entrance that draws air from the atmosphere;
   a tunnel air intake duct that directs tunnel air from the tunnel to a mixing chamber of a control module;

an outside air intake duct that directs outside air from the atmosphere to the mixing chamber of the control module;
a return air intake duct that directs return air from a structure to the mixing chamber of the control module;
the control module comprising three entry openings for the tunnel air intake duct, the outside air intake duct, and the return air intake duct;
the mixing chamber forming a cavity defined by the walls of the control module, wherein the air from the tunnel air intake duct, the outside air intake duct, and the return air intake ducts are mixed in the mixing chamber;
the control module regulates and directs the air received from the tunnel air intake duct, the outside air intake duct and the return air intake duct to an air supply that is in communication with an exterior portion of the air to air heat exchanger, wherein the exterior portion of the air to air heat exchanger venting to the atmosphere, and to another air supply in communication with an interior portion of the air to air heat exchanger.

2. The system for providing tempered air to the air to air heat exchanger according to claim 1, wherein the tunnel includes a plurality of tunnels.

3. The system for providing tempered air to the air to air heat exchanger according to claim 1, wherein the control module further includes motorized dampers to direct and regulate the intake air ducts and the air supplies.

4. The system for providing tempered air to the air to air heat exchanger according to claim 1, wherein the control module includes temperature sensors and humidity sensors in each of the outside air intake duct, the tunnel air intake duct, and the return air intake duct; wherein the sensors are in electrical communication with a programmable logic controller.

5. The system for providing tempered air to the air to air heat exchanger according to claim 4, wherein the programmable logic controller calculate and directs the opening and closing of the dampers to provide the most efficient use of the air from the air intake ducts depending upon the temperature and humidity conditions of each of the air streams in view of desired structure temperature inputted into the programmable logic controller by an operator.

6. The system for providing tempered air to the air to air heat exchanger according to claim 4, wherein the programmable logic controller receives a desired temperature and a desired ventilation rate.

7. The system for providing tempered air to the air to air heat exchanger according to claim 4, wherein the programmable logic controller actuates the dampers to provide a certain mix of air to enter the mixing chamber of the control module.

8. The system for providing tempered air to the air to air heat exchanger according to claim 7, wherein the mixing chamber opens into a supply duct for the outside portion of the air to air heat exchanger and a structure return air supply duct, wherein the supply duct includes a damper, wherein the structure return air supply duct includes a structure return air supply damper, wherein both of the supply dampers are under the direction of the programmable logic controller.

9. The system for providing tempered air to the air to air heat exchanger according to claim 1, wherein the air to air heat exchanger is a heat pump.

10. The system for providing tempered air to the air to air heat exchanger according to claim 9, wherein the control module can operate independently of the heat pump or in combination with the heat pump.

11. The system for providing tempered air to the air to air heat exchanger according to claim 9, wherein the air is provided to an exterior portion of the heat pump.

12. The system for providing tempered air to the air to air heat exchanger according to claim 1, wherein the system ties into existing ductwork for an air to air heat exchanger.

13. The system for providing tempered air to the air to air heat exchanger according to claim 1, wherein the control module comprises the mixing chamber, wherein the mixing chamber is a cavity or volume defined by the walls and structure of the control module.

14. The system for providing tempered air to the air to air heat exchanger according to claim 1, wherein the control module comprises the mixing chamber, wherein the mixing chamber comprises entry openings for the outside air intake duct, the tunnel air intake duct, and the return air intake duct, wherein the mixing chamber comprises two exit openings.

15. The system for providing tempered air to the air to air heat exchanger according to claim 1, wherein the control module comprises the mixing chamber, wherein the mixing chamber comprises two exit openings for a supply duct to the air to air heat exchanger and a structure return air supply duct.

16. The system for providing tempered air to the air to air heat exchanger according to claim 1, wherein the system provides supply air to the air to air heat exchanger during a heating cycle that is warmer in temperature than a current temperature of the ambient air or the system provides supply air to an air to air heat exchanger during a cooling cycle that is cooler in temperature than the current temperature of the ambient air.

17. A system for providing tempered air to a heat pump, comprising:
at least three air intake air sources, comprising a tunnel air intake duct, an outside air intake duct, and a return air intake duct;
at least two air supplies;
a control module comprising three entry openings for the tunnel air intake duct, the outside air intake duct, and the return air intake duct;
the control module comprising a mixing chamber defined by the walls of the control module, wherein air from the tunnel air intake duct, the outside air intake duct, and the return air intake ducts are mixed in the mixing chamber;
controls to regulate the flow of air into the control module and from the control module to the air supplies;
a tunnel that supplies the tunnel air intake duct; and
wherein one air supply is in communication with the control module and the heat pump, while another air supply is in communication with the control module and an interior of a structure.

18. A system for providing tempered air to an air to air heat exchanger, comprising:
a control module having a tunnel air intake duct that directs tunnel air from a tunnel to the control module;
the control module having an outside air intake duct that directs outside air from the atmosphere to the control module;
the control module having a return air intake duct that directs return air from a structure to the control module;
the control module having a mixing chamber, the control module comprising three entry openings for the tunnel air intake duct, the outside air intake duct, and the return air intake duct; the mixing chamber forming a cavity defined by the walls of the control module, wherein the air from the tunnel air intake duct, the outside air intake duct, and the return air intake ducts are mixed in the mixing chamber; the control module comprising dampers for the tunnel air intake duct, the outside air intake duct and the return air intake duct; wherein the mixing chamber comprises two exit openings;

and, the control module regulate and directs the air received from the tunnel air intake duct, the outside air intake duct, and the return air intake duct to an air supply that is in communication with an exterior portion of the air to air heat exchanger and to another air supply in communication with an interior portion of the air to air heat exchanger.

19. A process for providing tempered air to an air to air heat exchanger, comprising:

providing a tunnel beneath ground level;

drawing air from the atmosphere into an entrance of the tunnel;

directing tunnel air through a tunnel air intake duct to a control module;

directing outside air from the atmosphere through an outside air intake duct to the control module;

directing return air from the structure through a return air intake duct to the control module; the control module comprising three entry openings for the tunnel air intake duct, the outside air intake duct, and the return air intake duct, the mixing chamber forming a cavity defined by the walls of the control module, wherein the air from the tunnel air intake duct, the outside air intake duct, and the return air intake duct are mixed in the mixing chamber; and directing the air received from the tunnel air intake duct, the outside air intake duct and the return air intake duct in the control module to an air supply that is in communication with an exterior portion of the air to air heat exchanger and to another air supply in communication with an interior portion of the air to air heat exchanger.

* * * * *